United States Patent
Suciu et al.

(10) Patent No.: US 7,631,485 B2
(45) Date of Patent: Dec. 15, 2009

(54) TIP TURBINE ENGINE WITH A HEAT EXCHANGER

(75) Inventors: Gabriel L. Suciu, Glastonbury, CT (US); Brian Merry, Andover, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 11/718,429

(22) PCT Filed: Dec. 1, 2004

(86) PCT No.: PCT/US2004/039975

§ 371 (c)(1),
(2), (4) Date: May 2, 2007

(87) PCT Pub. No.: WO2006/059973

PCT Pub. Date: Jun. 8, 2006

(65) Prior Publication Data

US 2008/0093174 A1    Apr. 24, 2008

(51) Int. Cl.
*F02C 3/073* (2006.01)
(52) U.S. Cl. ..................... 60/226.1; 60/39.83
(58) Field of Classification Search .............. 60/226.1, 60/39.43, 39.512, 787, 785, 770, 804, 800, 60/805, 165, 266, 806, 39.08, 39.83
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |

(Continued)

FOREIGN PATENT DOCUMENTS

DE        1173292        7/1964

(Continued)

*Primary Examiner*—Michael Cuff
*Assistant Examiner*—Vikansha S Dwivedi
(74) *Attorney, Agent, or Firm*—Carlson, Gaskey & Olds PC

(57) ABSTRACT

A liquid-air heat exchanger extracts thermal energy from an engine lubricating fluid system. The liquid-air heat exchanger is located within a tailcone section and is in communication with a portion of the fan bypass airflow which enters the tailcone section through an annular tailcone exhaust nozzle entrance to transfer thermal energy into the combined airflow out of the engine to recover thrust loss ducted from the fan bypass stream.

20 Claims, 5 Drawing Sheets

U.S. PATENT DOCUMENTS

| | | | |
|---|---|---|---|
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 19519322 | 11/1996 |
| FR | 1367893 | 7/1964 |
| GB | 905136 | 9/1962 |
| GB | 1026102 | 4/1966 |
| GB | 1287223 | 8/1972 |
| GB | 1338499 | 11/1973 |
| GB | 2026102 | 1/1980 |
| JP | 10184305 | 7/1998 |
| WO | 9902864 | 1/1999 |
| WO | 02081883 | 10/2002 |
| WO | 2004022948 | 3/2004 |
| WO | 2004092567 | 10/2004 |
| WO | 2006059973 | 6/2006 |
| WO | 2006059974 | 6/2006 |
| WO | 2006059981 | 6/2006 |
| WO | 2006059994 | 6/2006 |
| WO | 2006059995 | 6/2006 |
| WO | 2006060011 | 6/2006 |
| WO | 2006060013 | 6/2006 |
| WO | 2006060014 | 6/2006 |

TIP TURBINE ENGINE WITH A HEAT EXCHANGER

This invention was made with government support under Contract No.: F33657-03-C-2044. The government therefore has certain rights in this invention.

BACKGROUND OF THE INVENTION

The present invention relates to a tip turbine engine, and more particularly to a non-rotating compartment located along an engine centerline.

An aircraft gas turbine engine of the conventional turbofan type generally includes a forward bypass fan, a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter length.

A gearbox assembly aft of the fan-turbine rotor assembly provides a speed increase between the fan-turbine rotor assembly and the axial compressor. A lubricating fluid system of the tip turbine engine supplies lubricating fluid to the gearbox assembly and other rotating components. Lubricating fluid systems heretofore utilized in gas turbine engines are inapplicable to a tip turbine engine.

Accordingly, it is desirable to provide a lightweight lubricating fluid supply system for a tip turbine engine which is compact, relatively uncomplicated, provides a low part count and is inexpensive to manufacture yet provides a high degree of reliability.

SUMMARY OF THE INVENTION

A non-rotating compartment for a tip turbine engine according to the present invention is defined between an inner support housing, an outer support housing and an aft housing.

The non-rotating compartment provides a space that may be utilized for a multitude of engine accessories and components. As the non-rotating compartment is located along the engine centerline and spaced a distance from the annular combustor, the non-rotating compartment provides a relatively low temperature compartment to receive relatively sensitive components. The non-rotating compartment may also enclose an engine lubricating fluid system. The non-rotating compartment may alternatively be utilized in it entirety as a lubricating fluid sump or may be still further compartmentalized to contain other additional components within the separate compartments.

The present invention therefore provides a lightweight lubricating fluid system for a tip turbine engine which is compact, relatively uncomplicated, provides a low part count, is inexpensive to manufacture yet provides a high degree of reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
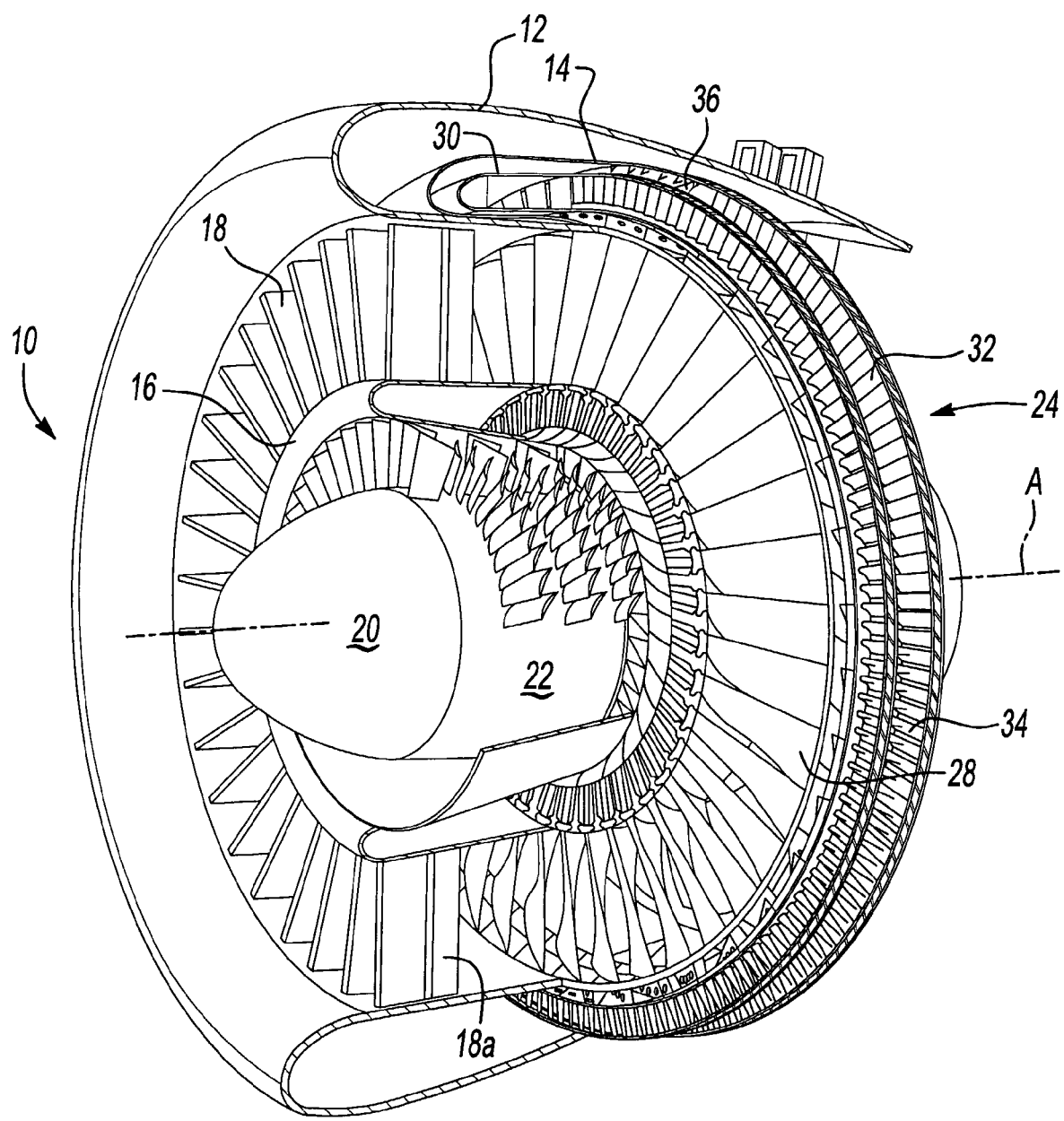
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a nonrotatable static outer support structure 14 and a nonrotatable static inner support structure 16. A multitude of fan inlet guide vanes 18 are mounted between the static outer support structure 14 and the static inner support structure 16. Each inlet guide vane preferably includes a variable trailing edge 18A.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the nonrotatable static outer support structure 14.

A turbine 32 includes a multitude of tip turbine blades 34 (two stages shown), which rotatably drive the hollow fan blades 28 relative to a multitude of tip turbine stators 36 which extend radially inwardly from the static outer support structure 14. The annular combustor 30 is axially forward of the turbine 32 and communicates with the turbine 32.

Figure 2:
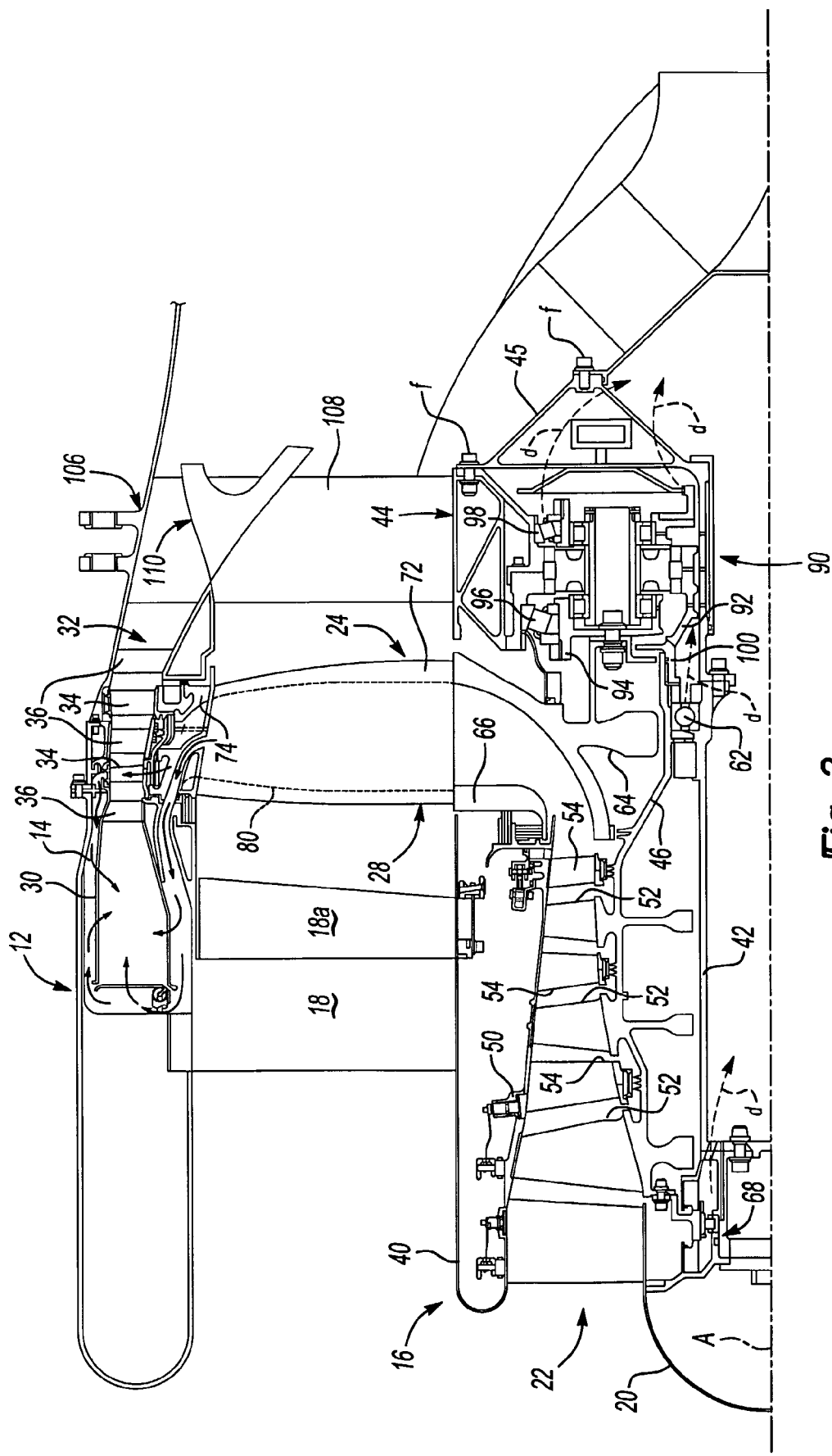
FIG. 2 is a longitudinal sectional view of a tip turbine engine along an engine centerline.

Referring to FIG. 2, the nonrotatable static inner support structure 16 includes a splitter 40, a static inner support housing 42, and a static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extends radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72, and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused by the diffuser section 74 axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the airflow from the turbine blades 34 with the bypass airflow through the fan blades 28.

Figure 3:
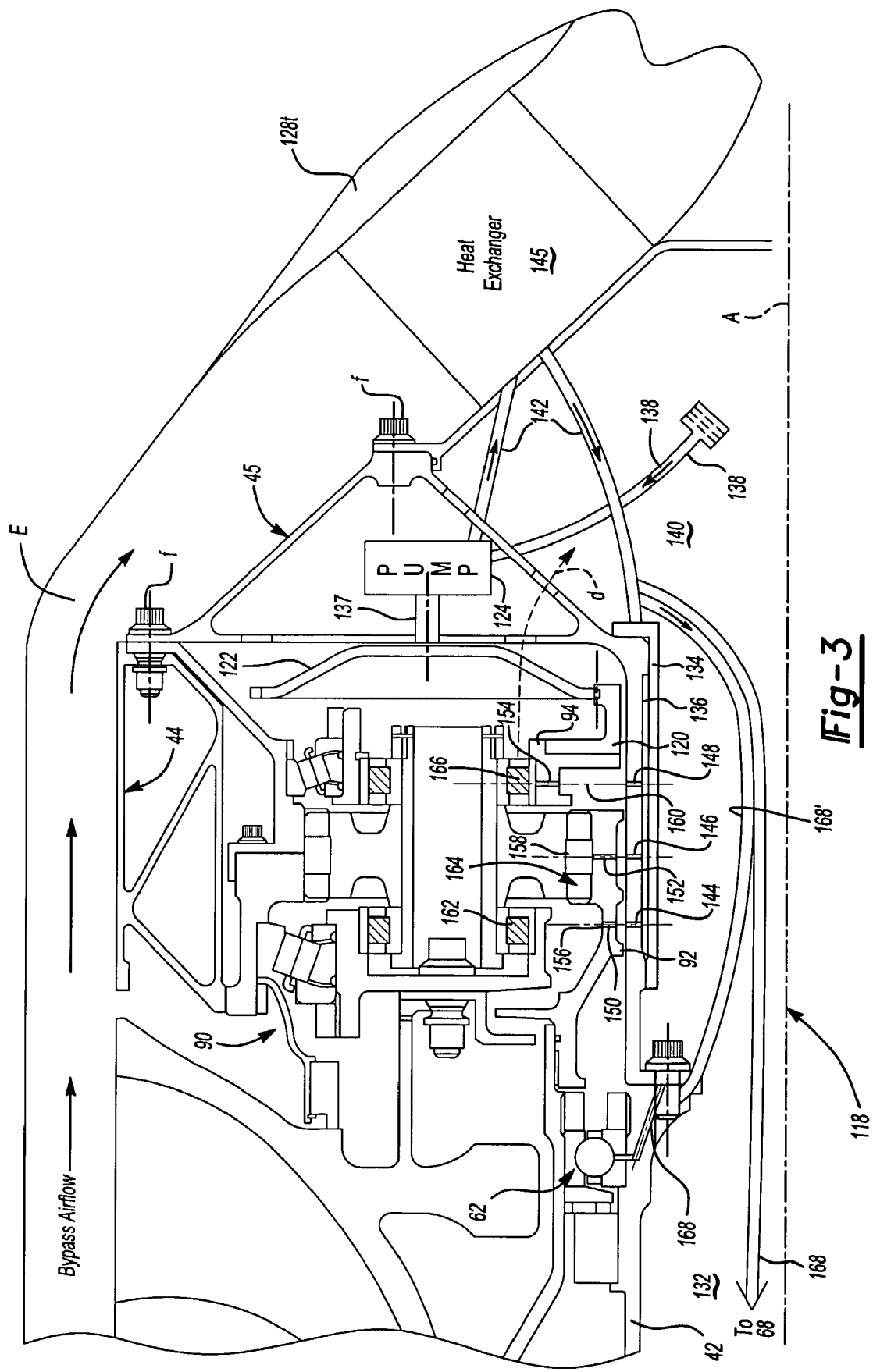
FIG. 3 is an expanded view of a lubricating fluid system.

Referring to FIG. 3, an engine lubricating fluid system 118 includes an lubricating fluid pump drive gear 120 mounted for rotation with the planet carrier 94 about the engine axis A. The lubricating fluid pump drive gear 120 drives a lubricating fluid pump gear 122 which drives a lubricating fluid pump 124 through a shaft 137. The lubricating fluid pump gear 122 is located adjacent the gearbox assembly 90 between the static inner support housing 42 and the static outer support housing 44. Preferably, the lubricating fluid pump 124 is located within an aft static support structure 45 which is attached to the static inner support housing 42 and the static outer support housing 44 through fasteners f such as bolts or the like.

Figure 4:
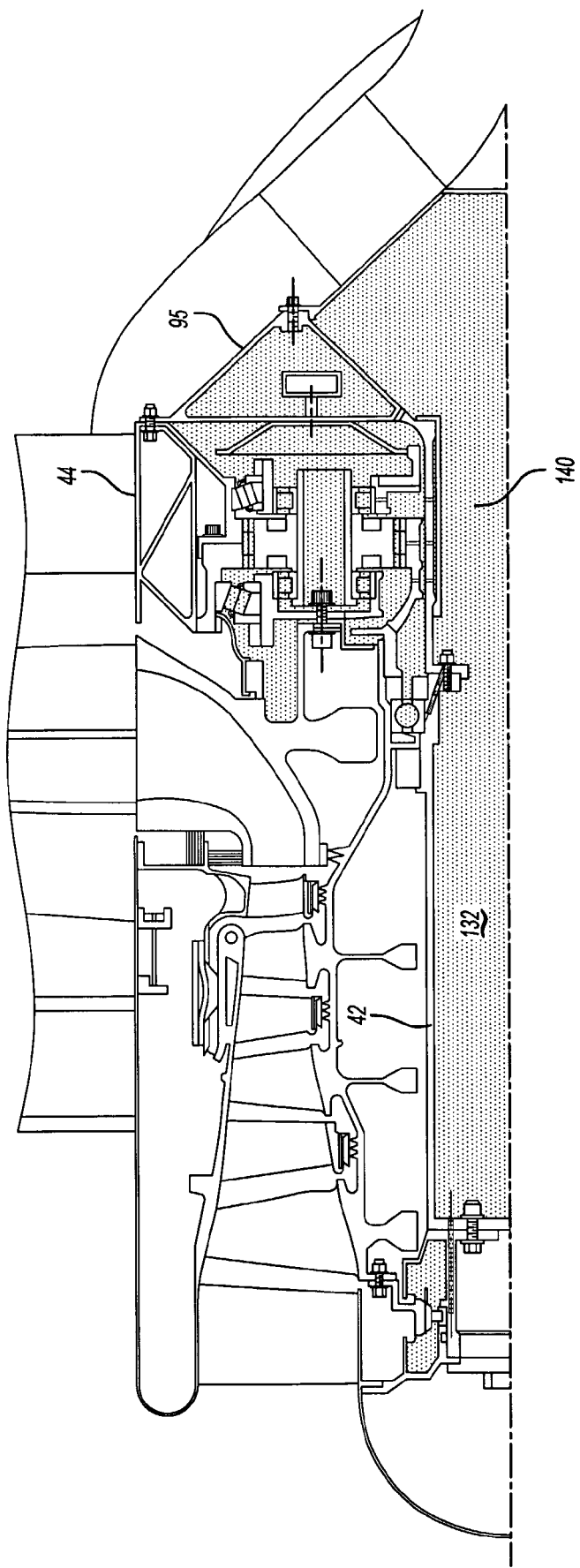
FIG. 4 is an expanded view of a non-rotating cavity of a lubricating fluid system.

The static inner support housing 42 and the aft static support structure 45 define a non-rotating compartment 132 along the engine centerline A (FIG. 4; shaded). The non-rotating compartment 132 provides a space which may be utilized for a multitude of engine accessories and components. As the non-rotating compartment 132 is located along the engine centerline A and displaced from the annular combustor 30 (FIG. 2), the non-rotating compartment 132 provides a relatively low temperature compartment to receive relatively sensitive components.

Most preferably, the non-rotating compartment 132 encloses the engine lubricating fluid system 118. The engine lubricating fluid system 118 is but one illustrated example for which the non-rotating compartment 132 may be utilized. The non-rotating compartment 132 may be utilized in its entirety (as illustrated in FIG. 4) as the lubricating fluid sump (FIG. 4) or may be still further compartmentalized to contain other engine components.

A lubricating fluid plenum sleeve 134 mounted to the static support structure 45 defines an annular lubricating fluid plenum 136 between the lubricating fluid plenum sleeve 134 and an axially extending portion of the static support structure 45. The lubricating fluid pump 124 receives lubricating fluid from within the non-rotating compartment 132 through a supply line 138 (illustrated schematically) which draws lubricating fluid from the lubricating fluid sump 140 (FIG. 4) defined by the non-rotating compartment 132.

From the lubricating fluid pump 124 lubricating fluid is communicated to the annular lubricating fluid plenum 136 through a lubricating fluid feed line 142 (illustrated schematically) which passes through an liquid-air heat exchanger 145 (one shown) to extract thermal energy from the engine lubricating fluid system 118. The lubricating fluid pump 124 thereby pressurizes the annular lubricating fluid plenum 136.

The liquid-air heat exchanger 145 is preferably located within a tailcone section 128t of the static support structure 45. The liquid-air heat exchanger 145 is in communication with a portion of the fan bypass airflow which enters the tailcone section 128t through an annular tailcone exhaust nozzle entrance E. The liquid-air heat exchanger 145 is located adjacent the engine lubricating fluid system 118 and the gearbox assembly 90 to minimize conduit routing paths and to transfer thermal energy into the combined airflow out of the engine 10 to recover energy converted to heat as well as thrust loss ducted from the fan bypass stream through the annular tailcone exhaust nozzle entrance E. That is, the fan bypass airflow receives thermal energy from the heat exchanger 145 which increases engine efficiency. It should be understood that other liquid-air heat exchanger locations may also be utilized by the instant invention.

Lubricating fluid within the annular lubricating fluid plenum 136 is communicated through the static support structure 45 by way of a multitude of lubricating fluid passages 144, 146, 148 (one of each shown). It should be understood that any number of passages may be utilized with the instant invention. The lubricating fluid passages 144, 146, 148 are directed toward the gearbox assembly 90. Preferably, lubricating fluid passages 144, 146, 148 are respectively directed toward a multitude of forward planet bearing passages 150 (one shown), a multitude of sun gear passages 152 (one shown), and a multitude of aft planet bearing passage 154 (one shown). It should be understood that although only one of each of the multitude of the passages are illustrated, multiple passages 150, 152, 154 radially displaced about the engine axis A will be located at the same axial position as the passages 144, 146, 148 along engine axis A. That is, although the lubricating fluid passages 144, 146, 148 are through the static support structure 45 which is fixed in rotation, the multitude of passages 150, 152, 154 are being rotated directly adjacent, and preferably each within a common plane of each passage 156, 158, 160. It should be understood that the passages need not be directly opposed.

Lubricating fluid is essentially sprayed under pressure from within the annular lubricating fluid plenum 136 through the lubricating fluid passages 144, 146, 148 and into the multitude of passages 150, 152, 154 as they revolve thereby. Lubricating fluid from the multitude of passages 150, 152, 154 is thereby communicated respectively to a multitude of forward planet bearings 162 (one shown), a sun gear 164 mounted to the sun gear shaft 92, and an aft planet bearing 166 (one shown). Lubricating fluid is thereby communicated directly into the gearbox assembly 90 without heretofore static/rotating transfer interfaces.

Lubricating fluid is also communicated to the forward bearing assembly 68 and the aft bearing assembly 62 through respective oil feeds 168, 168'. The oil feeds 168, 168' preferably communicate lubricant from the lubricating fluid feed line 142.

Lubricating fluid is then returned to the lubricating fluid sump 140 through a drain passage d (other drain passages d shown in FIG. 1). Notably, the drain passages are for an engine operated in a vertical flight mode. Should the engine be operated horizontally, the oil drain system is according adjusted such as by proving a scavenge pump with drain lines running to other areas.

Figure 5:
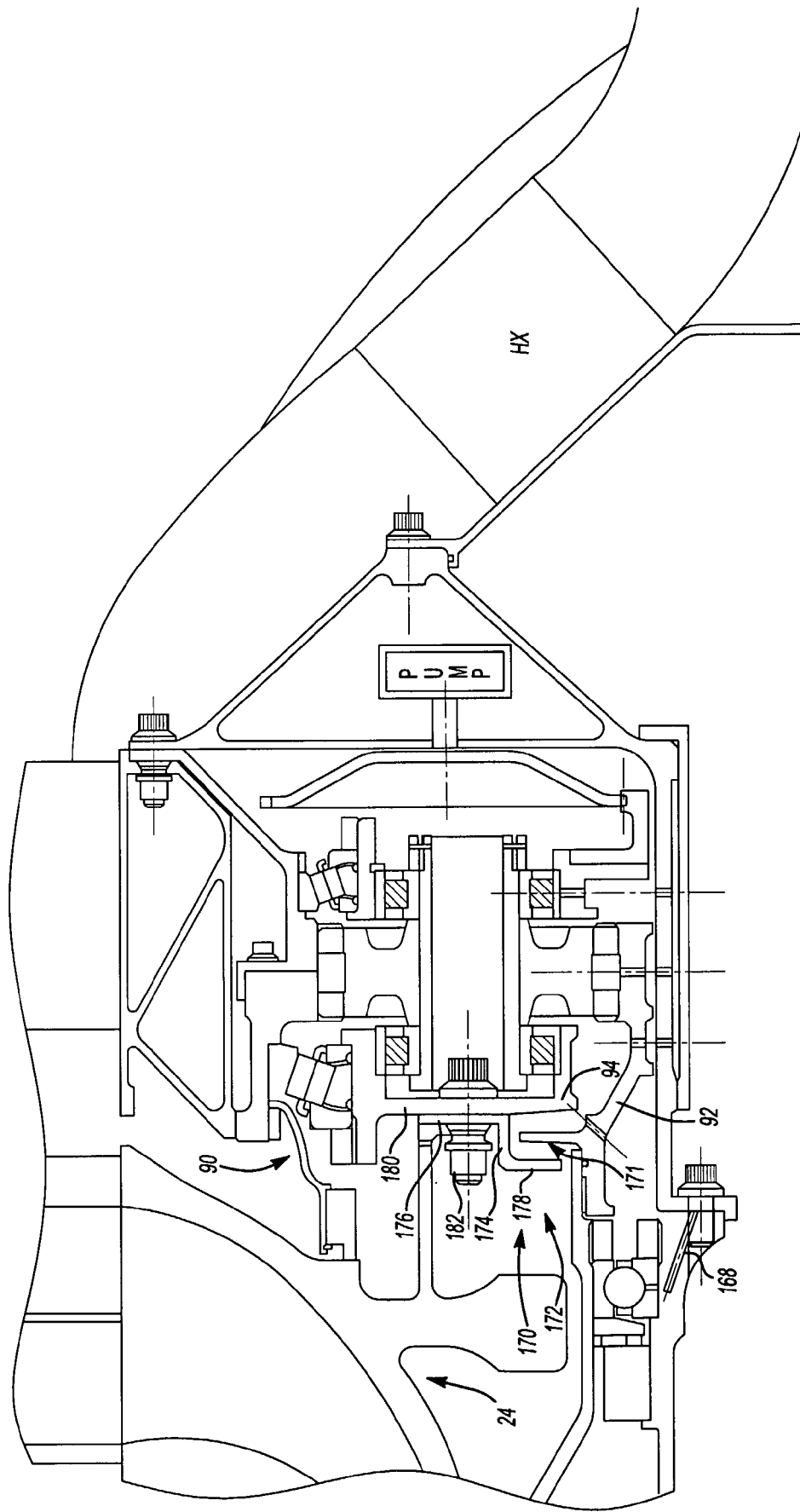
FIG. 5 is an expanded perspective view of a hydraulic seal of a lubricating fluid system.

Referring to FIG. 5, a hydraulic seal 170 is preferably located forward of the gearbox assembly 90 to maintain the lubricating fluid in the gearbox assembly 90 by preventing lubricating fluid from traveling axially forward toward the fan hub 64. The hydraulic seal 170 provides a barrier formed by blockage of lubricating fluid to prevent the lubricating fluid from migrating away from the rotating components. The hydraulic seal 170 is essentially formed by lubricating fluid filling the gap between the inner radial flange 171 and the planet carrier face 180 which is held in place by the centrifugal force from the spinning seal assembly.

The hydraulic seal 170 includes an inner radial flange 171 and an outer radial flange 172. The inner radial flange 171 extends radially from the sun gear shaft 92 which rotates with the axial compressor 22 (FIG. 2). The outer radial flange 172 rotates with planet carrier 94 which rotates with the fan-turbine rotor assembly 24 (FIG. 2). Oil does not enter inside of the axial compressor. This area is maintained oil free. The hydraulic seal prevents high pressure, hot air from entering the gearbox assembly 90 and also maintains oil within the gearbox assembly 90.

The inner radial flange 171 at least partially radially overlaps the outer radial flange 172. The inner radial flange 171 is a relatively flat annular disk which is integrally formed with the sun gear shaft 92. The outer radial flange 172 is preferably step-shaped in cross-section. The outer radial flange 172 includes an axial fan hub section 174, a radial mount section 176 extending from the axial fan hub section 174, and an outer radial seal section 178 extending from the axial fan hub section 174. The radial mount section 176 is parallel to a planet carrier face 180 of the planet carrier 94 and is preferably attached thereto through a fastener 182 such as a bolt or the like. The fastener 182 is preferably the same fastener 182 which mounts the fan-turbine rotor assembly 24 to the planet carrier 94 of the gearbox assembly 90.

The inner radial flange 171 extends between the outer radial seal section 178 and the planet carrier face 180 to form a hydraulic seal. The inner radial flange 171 rotates relative to the outer radial seal section 178 and the planet carrier face 180 to maintain lubricating fluid within the gearbox assembly 90 (FIG. 4). The hydraulic seal 170 prevents lubricating fluid from entering into the air flow streams within the engine 10 without additional engine assembly procedures. That is, the air pressure from the last stage of the axial compressor balances with the oil pressure created by the spinning seal cavity.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A tip turbine engine comprising:
a nonrotatable support structure mounted about an engine centerline, said nonrotatable support structure having a tailcone section;
a heat exchanger located at least partially within said tailcone section; and
a tailcone entrance within said tailcone section, a portion of a fan bypass airflow communicated into said tailcone entrance such that said heat exchanger is in communication with said portion of said bypass airflow.

2. The tip turbine engine as recited in claim 1, wherein said nonrotatable support structure includes an inner static support housing and an outer static support housing located coaxial to said engine centerline.

3. The tip turbine engine as recited in claim 2, further comprising an aft housing which supports said tailcone section, said aft housing attachable to said inner static support housing and said outer static support housing.

4. The tip turbine engine as recited in claim 3, wherein said heat exchanger is located aft of said aft housing.

5. The tip turbine engine as recited in claim 3, further comprising a pump located within said aft housing.

6. The tip turbine engine as recited in claim 2, further comprising a gearbox mounted between said inner static support housing and said outer static support housing.

7. The tip turbine engine as recited in claim 6, wherein said gearbox includes a sun gear shaft mounted about said inner static support housing.

8. The tip turbine engine as recited in claim 6, wherein said gearbox includes a planet carrier mounted about said inner static support housing.

9. The tip turbine engine as recited in claim 8, wherein a pump is driven by said planet carrier.

10. The tip turbine engine as recited in claim 9, wherein lubricating fluid from said pump is communicated between said gearbox and said heat exchanger.

11. The tip turbine engine as recited in claim 10, wherein said lubricating fluid is communicated to said gearbox through an annular lubricating fluid plenum within said inner static support housing.

12. The tip turbine engine as recited in claim 11, wherein said lubricating fluid is communicated to said annular lubricating fluid plenum under pressure by said pump.

13. The tip turbine engine as recited in claim 1, wherein said heat exchanger is a liquid-air heat exchanger.

14. A tip turbine engine comprising:
a nonrotatable support structure mounted about an engine centerline, said nonrotatable support structure having a first lubricating fluid passage and a second lubricating fluid passage therethrough, said nonrotatable support structure having a tailcone section with a tailcone entrance;
a planetary gearbox mounted adjacent said nonrotatable support structure, said planetary gearbox including a sun gear shaft and a planet carrier, said sun gear shaft having a sun gear shaft lubricating fluid passage and said planet carrier having a planet carrier lubricating fluid passage;
an axial compressor rotor mounted for rotation with said sun gear shaft about said engine centerline;
a fan mounted aft of said axial compressor, said fan mounted for rotation with said planet carrier about said engine centerline;
a lubrication system which provides a lubricating fluid to said planetary gearbox through said first lubricating fluid passage, said second lubricating fluid passage, said sun gear shaft lubricating fluid passage and said planet carrier lubricating fluid passage; and
a heat exchanger located at least partially within said tailcone section, a portion of a fan bypass airflow communicated into said tailcone entrance such that said heat exchanger is in communication with said portion of said bypass airflow, said heat exchanger in fluid communication with said lubricating fluid.

15. The tip turbine engine as recited in claim 14, wherein said lubricating fluid is communicated to said first lubricating fluid passage, and said second lubricating fluid passage through an annular lubricating fluid plenum within said inner static support housing.

16. The tip turbine engine as recited in claim 15, wherein said lubricating fluid is communicated to said annular lubricating fluid plenum under pressure by a pump.

17. The tip turbine engine as recited in claim 1, wherein said tailcone section is aft of a turbine.

18. The tip turbine engine as recited in claim 1, wherein said tailcone entrance is annular and forward facing.

19. The tip turbine engine as recited in claim 1, wherein said tailcone section is at least partially radially located within an outer nacelle.

20. The tip turbine engine as recited in claim 1, wherein said tailcone section is defined along an engine centerline.

* * * * *